(12) United States Patent
Fujikawa

(10) Patent No.: US 7,904,944 B2
(45) Date of Patent: Mar. 8, 2011

(54) IMAGE FORMING APPARATUS, CONTROL METHOD, AND COMPUTER-READABLE STORAGE MEDIUM THEREFOR

(75) Inventor: Shinji Fujikawa, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 803 days.

(21) Appl. No.: 11/924,020

(22) Filed: Oct. 25, 2007

(65) Prior Publication Data

US 2008/0104668 A1    May 1, 2008

(30) Foreign Application Priority Data

Oct. 26, 2006    (JP) .................. 2006-291273

(51) Int. Cl.
*G06F 7/04* (2006.01)
*H04L 9/32* (2006.01)
*H04L 9/00* (2006.01)

(52) U.S. Cl. .............. 726/2; 726/3; 726/4; 726/5; 726/6; 726/27; 726/28; 726/29; 726/30; 713/182; 713/183; 713/184; 713/185; 713/186

(58) Field of Classification Search ................ 726/2
See application file for complete search history.

(56) References Cited

U.S. PATENT DOCUMENTS

2005/0125674 A1 * 6/2005 Nishiki et al. ................ 713/182

FOREIGN PATENT DOCUMENTS

| JP | 2002-197500 A | 7/2002 |
|---|---|---|
| JP | 2004-38886 A | 2/2004 |

* cited by examiner

*Primary Examiner* — Longbit Chai
(74) *Attorney, Agent, or Firm* — Canon USA Inc IP Division

(57) ABSTRACT

A method and apparatus for obtaining room entry information associated with a user, extracting executable operation flows, and displaying an operational screen for executing the extracted operation flows.

15 Claims, 11 Drawing Sheets

IMAGE FORMING APPARATUS, CONTROL METHOD, AND COMPUTER-READABLE STORAGE MEDIUM THEREFOR

BACKGROUND OF THE INVENTION

1. Field of the Invention

The present invention relates to a technique that executes workflows which are executable depending on the location where an image forming apparatus is installed.

2. Description of the Related Art

In recent years, image forming apparatuses called multifunction devices have come to offer many functions. Therefore, a user is able to obtain desired output results by operating many functions.

However, in order to operate the many functions, the user must perform setting processing numerous times via an operation panel of the image forming apparatus, reducing ease of operation.

In order to solve the above-mentioned problem, a function has been provided which defines user operations and settings as a string of operation flows. By defining an operation flow with such a function, a button is displayed for executing processing based on the operation flow. Upon the user instructing with the button, the image forming apparatus can automatically execute a string of processing set to the operation flow corresponding to the instructed button.

For example, an operation of "display a menu for a product catalog of own company, and perform bookbinding printing for the catalog selected by user therefrom" is defined as "catalog printing operation flow". Also, an operation of "display a menu for internal company meeting minutes, and print the meeting minutes selected by user therefrom" is defined as "meeting minutes printing operation flow". Using the operation flow defining function as described above enables executing a complex operation sequence as a flow in a defined form.

Consequently, for example, even if a user does not know details such as where the catalog data file is located, or what settings to use for bookbinding printing for a catalog, by executing the instructions for "catalog printing operation flow", the user can readily print a catalog.

In a business office environment, improvements to security management have been demanded in recent years as a way to prevent information leakage, etc. As one such way, a security system may perform authentication employing an IC card or the like when a user enters or leaves a building or a room.

A user entering a room has an IC card whereupon identification information is recorded to uniquely identify a user. The entrance/exit of a room of which entry/exit is to be managed is locked, and an IC card reader/writer is installed. At the time of a user entering the room, the IC card reader/writer reads the identification information of the user, and compares this to a list of user identification information for permitting entry which is registered beforehand. In the event that the identification information matches, the IC card reader/writer writes the room entry information such as room entry date and time to the IC card, and unlocks the lock on the room. Similarly, authentication of a user of an image forming apparatus and so forth may also be performed by employing this IC card reader/writer.

Japanese Patent Laid-Open No. 2002-197500 discloses a photocopier wherein an IC card reader/writer is installed, and the IC card reader/writer reads the IC card of the user, reading user identification information and room entry history information. In the event that determination is made that room entry history information is recorded, use of the photocopier is authorized. Hereby a technique for permitting use of a photocopier by users entering a room according to correct procedures is disclosed.

Japanese Patent Laid-Open No. 2004-38886 discloses an arrangement wherein identification information of participants in a meeting is authenticated, and determination is made as to whether a user is a participant in the meeting. In the event that the participant is determined to be a participant in the meeting, and history information is not held to indicate that meeting reference materials have been printed for the participant, a data server transmits printing data for meeting materials for participants as to a printer for the meeting room.

However, with the above-described conventional techniques, in the event that a user of the image forming apparatus correctly enters a room employing the IC card, the user can execute photocopy processing, etc., regardless of the installation location of the image forming apparatus.

In an example of the above-described conventional techniques, "Catalog printing operation flow" is an operation flow to print a company's catalog. An employee of the company would certainly be able to use this operation flow, as would an external person other than an employee.

On the other hand, "Meeting minutes printing operation flow" would only be permitted to be executed by an employee, since these are internal meeting minutes.

In the event that an image forming apparatus with such a flow set therein is installed at a reception area of the company where employees and external persons come and go, an image forming apparatus with traditional technology would allow output in the event that determination is made that correct room entry processing is performed.

Therefore, even at the reception space, if the correct room entry processing is performed, an image forming apparatus with traditional technology would allow the executing of "meeting minutes printing operation flow", whereby confidential documents could be seen by non-employees. Also, if a user forgets to pick up the printed material, or steps away from the image forming apparatus during printing for some reason, another person can take and remove the printed material during that time. Thus, with traditional technology, an inappropriate flow can be executed at an installation location of the image forming apparatus.

The above problem can be solved by changing the flow registered to an image forming apparatus depending on the location of installation of the image forming apparatus, but the following problems arise in registering flows.

If the operation flow registered to the image forming apparatus is changed according to the installation location, determination as to which operation flows to register to the respective image forming apparatus becomes difficult. As the number of image forming apparatuses, the number of operation flows, and the number of locations increase, this determination becomes increasingly difficult, and the workload for registering operation flows increases greatly.

Also, the location of the image forming apparatus may change due to a purchase of a new image forming apparatus. In such a case, re-registering the operation flow according to the new installation location is necessary, and as the number of image forming apparatuses to be moved increases, the workload to re-register increases, thus greatly increasing the registering workload.

SUMMARY OF THE INVENTION

The present is directed to providing a flow which is executable according to the installation location of the image forming apparatus without greatly increasing the workload of the user registering the flow.

According to one aspect of the present invention, an image forming apparatus for executing operation flow selecting from a plurality of operation flows wherein processing content is registered, includes a storage unit configured to store information relating to a location where each of the operation flows is executable, an obtaining unit configured to obtain room entry information of a user, an extracting unit configured to, based on room entry information obtained from the obtaining unit and information relating to executable locations for each operation flow stored by the storage unit, extract an executable operation flow with locations indicated by room entry information from the plurality of operation flows, and a display control unit configured to display an operation screen for executing the operation flow extracted by the extracting unit.

Further features of the present invention will become apparent from the following description of exemplary embodiments (with reference to the attached drawings).

DESCRIPTION OF THE EMBODIMENTS

Figure 1:
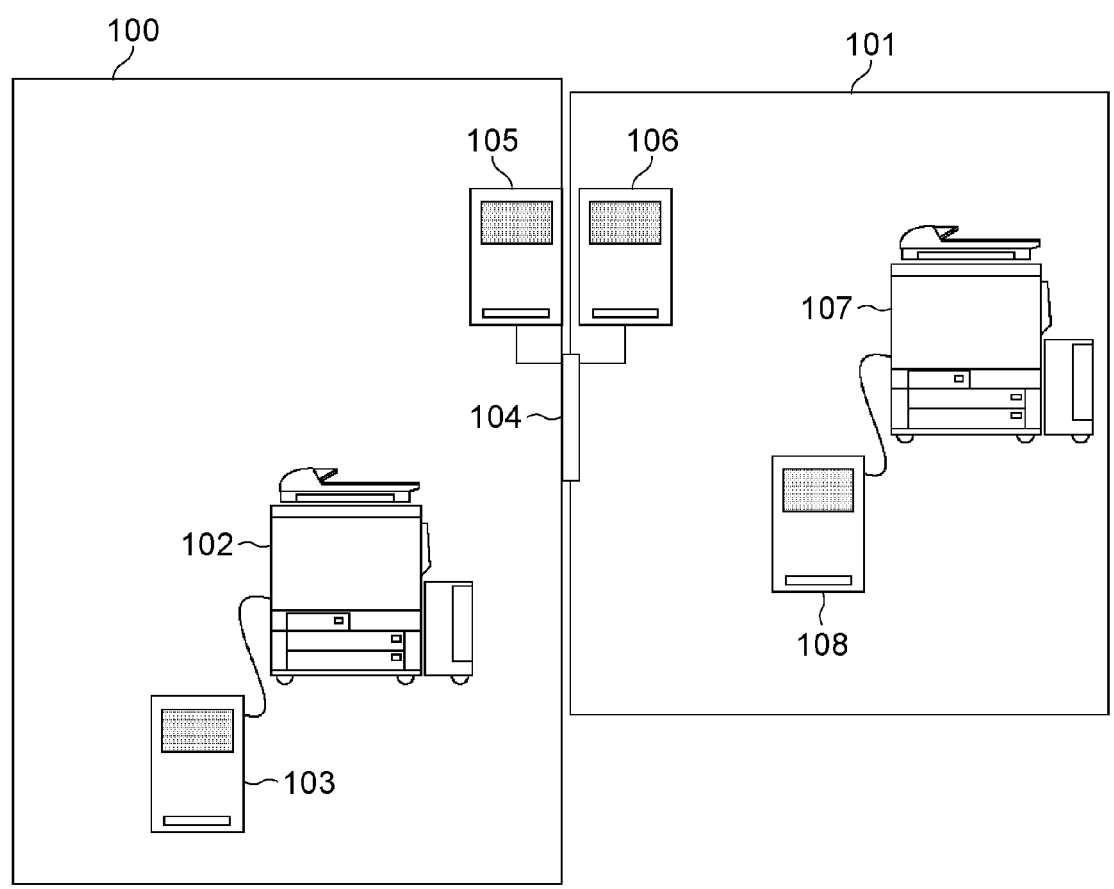
FIG. 1 is a diagram illustrating a system containing a multifunction apparatus.

FIG. 1 is a diagram illustrating a system containing a multifunction apparatus relating to a first embodiment of the present invention. FIG. 1 illustrates an example of an office, etc. wherein an IC card is employed to introduce a security system for managing room entry into a room.

As illustrated in FIG. 1, a reception room 100 is an environment where unauthorized persons, such as visitors may enter and leave. Conversely, a room 101 is a restricted area where only authorized persons can enter and leave.

A photocopier 102 is installed in the reception room 100. A photocopier IC card reader/writer 103 is connected to the photocopier 102, and determination can be made by reading the information recorded on an IC card as to whether the holder of the IC card can use the photocopier 102.

An electronic lock door 104 is the entrance/exit of the office room 101. The electronic lock door 104 is normally locked, preventing free entry/exit to/from the office room 101. The room entry IC card reader/writer 105 is connected to the electronic lock door 104. The room entry IC card reader/writer 105 stores information of the users allowed to enter/exit the office room 101. In the case that a person in the reception room 100 enters the office room 101, the room entry IC card reader/writer 105 reads the IC card held by the person entering the room. The room entry IC card reader/writer 105 then determines whether the person is allowed to enter/exit, and in the event determination is made that the person is allowed, the electronic lock door 104 is unlocked, enabling entry into the office room 101.

A room exit IC card reader/writer 106 is connected to the electronic lock door 104. The room exit IC card reader/writer 106 is similar to the room entry IC card reader/writer 105, and in the event of exiting the office room 101, the room exit IC card reader/writer 106 reads the IC card held by the person exiting the office room 101. Determination is made whether the person is allowed to enter/exit, and in the event determination is made that the person is allowed, the electronic lock door 104 is unlocked, enabling entry into the reception room 100.

A photocopier 107 is installed in the office room 101. A photocopier IC card reader/writer 108 is connected to the photocopier 107, and by reading information recorded on the IC card, determination can be made whether the holder of the IC card can user the photocopier 107.

Figure 2:
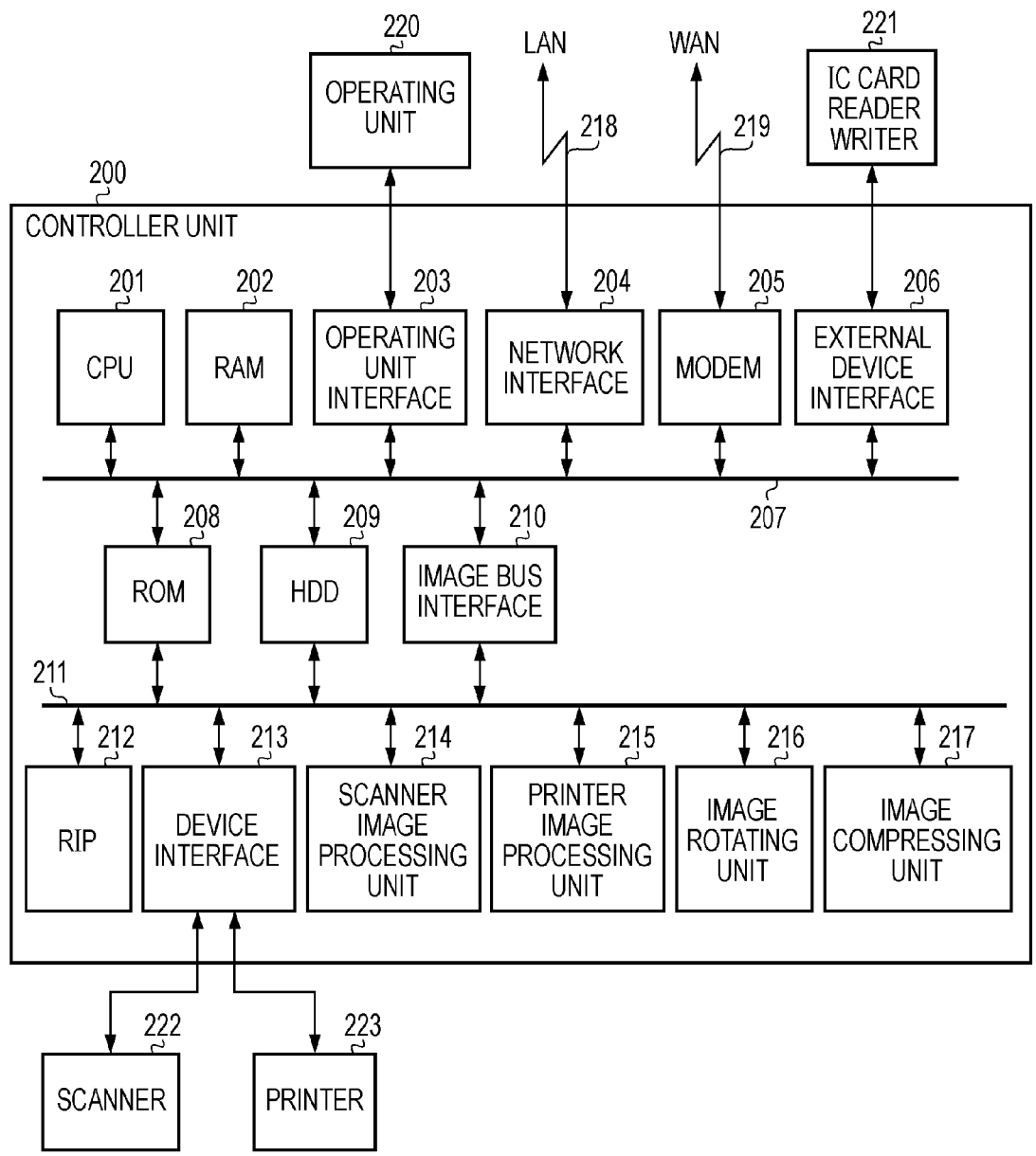
FIG. 2 is a block diagram illustrating the principal components of a multifunction apparatus.

FIG. 2 is a block diagram illustrating the configuration of the principal parts of the photocopier 102. Note that the photocopier 107 has a similar configuration. Note that the photocopiers 102 and 107 are examples of an apparatus which is appropriate as an image forming apparatus that can execute the operation flow selected by multiple operation flows wherein processing content is registered.

The photocopier 102 includes a controller unit 200, and the controller unit 200 is connected to a scanner 222 serving as an image input device, a printer 223 serving as an image output device, an operating unit 220, and an IC card reader/writer 221.

The controller unit 200 performs control to realize a copy function to output printing of the image data read by the scanner 222 with the printer 223. Also, by connecting the controller unit 200 to a LAN 218 or public network 219 (WAN), control for performing input/output of image information and device information is performed. Also, the controller unit 200 controls reading of information recorded on the IC card by the IC card reader/writer 221.

The controller unit 200 specifically has a CPU 201, and the CPU 201 starts up the operation system (OS) with a boot program stored in the ROM 208. The CPU 201 executes an application program stored on an HDD (hard disk drive) 209 with the OS, thereby executing various types of processes. A RAM 202 is employed as a work region of the CPU 201.

The RAM 202 provides a work region while also providing an image memory region for temporarily storing image data. The HDD 209 stores the above-mentioned application program and image data.

The CPU 201 is connected to a ROM 208, RAM 202, operating unit interface 203, network interface 204, modem 205, external device interface 206, and image bus interface 210, via a system bus 207.

The operating unit interface 203 is an interface with an operating unit 220 having a touch panel. The image data to be displayed to the operating unit 220 is output as to the operating unit 220. Also, the operating unit interface 203 transmits the information input by a user with the operating unit 220 to the CPU 201.

The network interface 204 is connected to the LAN 218, and performs input/output of information between the various devices on the LAN 218, via the LAN 218. The modem 205 is connected to the public network 219, whereby input/output of information is performed via the public network 219.

The external device interface 206 is connected to an IC card reader/writer 221, reads information written on the IC card, and writes information on the IC card, via the IC card reader/writer 221. Note that the IC card reader/writer 221 refers to the photocopier IC card reader/writer 103 connected to the photocopier 102 illustrated in FIG. 1 and the photocopier IC card reader/writer 106 connected to the photocopier 107.

The image bus interface 210 connects a system bus 2007 and an image bus 211 which transports image data at high speed, and is a bus bridge for converting data formats. The image bus 211 is made up of a PCI bus or IEEE 1394. A raster image processor (hereafter called "RIP") 212, a device interface 213, a scanner image processing unit 214, a printer image processing unit 215, an image rotating unit 216, and an image compressing unit 217 are provided on the image bus 211.

The RIP 212 is a processor to expand PDL code into a bit map image. The device interface 213 is connected to a scanner 222 and printer 223, and the device interface 213 performs conversion between a synchronous system and an asynchronous system of image data. The scanner image processing unit 214 performs correction, processing, and editing as to the input image data. The printer image processing unit 215 performs correction, resolution conversion and so forth according to the printer 223 as to the print output image data. The image rotating unit 216 performs rotation of image data. The image compressing unit 217 compresses multilevel image data into JPEG data, and compresses binary data into data such as JBIG, MMR, MH and the like, as well as performs expanding processing thereof.

Figure 3:
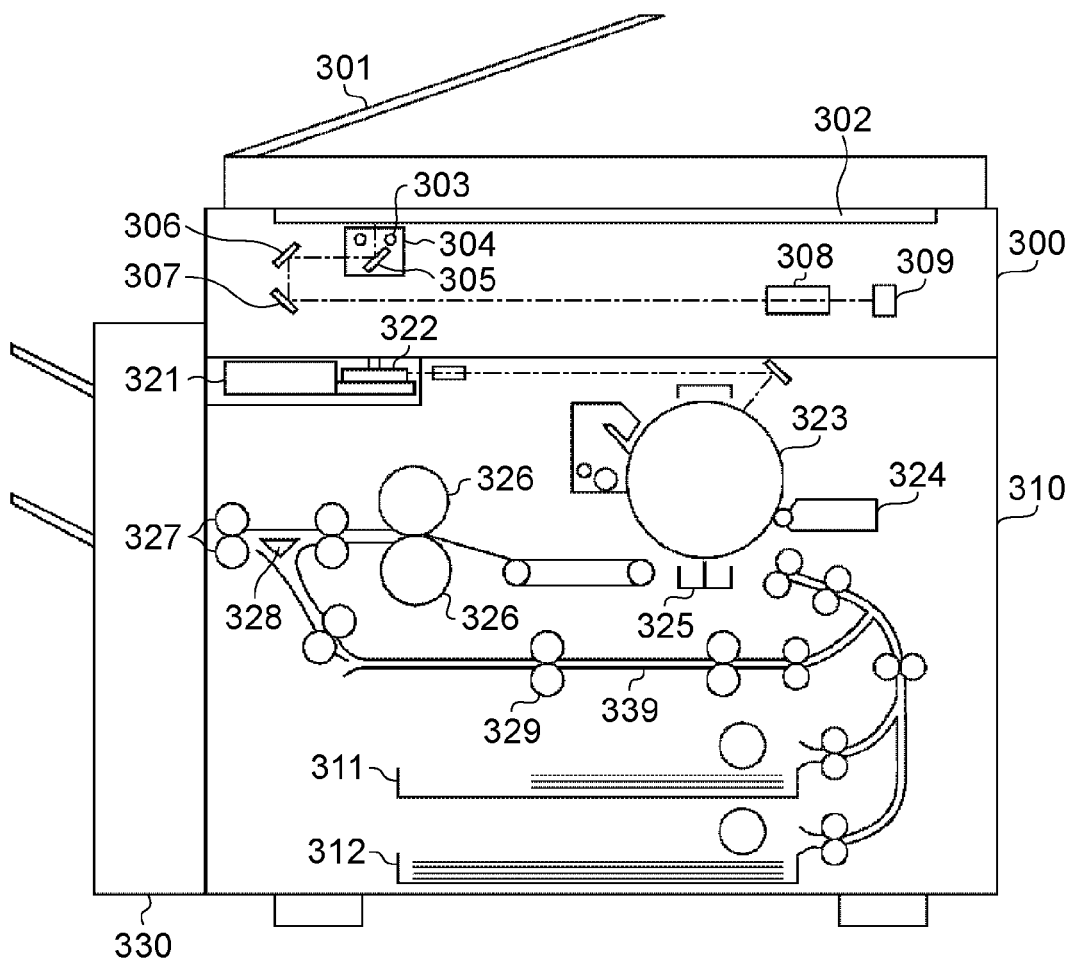
FIG. 3 is a side cross-sectional diagram illustrating hardware configuration of a scanner and a printer.

Next, the hardware configuration of the scanner 222 and printer 223 will be described with reference to FIG. 3. FIG. 3 is a side cross-sectional diagram illustrating hardware configuration of the scanner 222 and printer 223.

The scanner 222 and the printer 223 are in an integrated configuration, as illustrated in FIG. 3. The scanner 222 (300) has a document supply unit 301 mounted thereupon, and the document supply unit 301 conveys one document sheet at a time from the top in sequence to the platen glass 302, and each time the reading operation of each document is finished, the document thereof is discharged from the platen glass 302 to a discharge tray (not shown).

Upon the document being conveyed to the platen glass 302, the scanner 222 has a lamp 303 therein which lights, and the moving of the moving unit 304 is started. A reading scan as to the document on the platen glass 302 is performed with the moving of the moving unit 304. During this reading scan, the reflecting light from the document is guided by a CCD image sensor (hereafter called "CCD") 309 via the various mirrors 305, 306, 307, and lens 308, whereby the image on the document is formed on the image-capturing face of the CCD 309. An image which is image-formed on the image-capturing face is converted to an electrical signal, and this electrical signal is input into the control device (not shown) after being subjected to predetermined processing.

The printer 223 (310) has a laser driver 321, and the laser driver 321 drives a laser emitting unit 322 based on the image data input from the control device. Thus, a laser beam according to the image data is emitted from the laser emitting unit 322, and this laser beam is irradiated on a photosensitive drum 323 while being scanned.

The photosensitive drum 323 has an electrostatic latent image formed thereupon with the irradiated laser beam, and the electrostatic latent image becomes visible as a toner image by toner which is supplied by a developer 324. Recording sheets from cassettes 311 and 312 are supplied between the photosensitive drum 323 and transfer unit 325 via a conveyance path, whereby the toner image on the photosensitive drum 323 is transferred to the recording sheet supplied by the transfer unit 325, in synchronization with the irradiation timing of the laser beam.

The recording sheet onto which the toner image is transferred is conveyed via a conveying belt to a fusing roller pair (heating roller and pressure roller) 326, wherein the fusing roller pair 326 heats the recording sheet and fuses the toner image on the recording sheet to the recording sheet. The recording sheet having passed through the nip of the fusing roller pair 326 is discharged to a discharge unit 330 by a discharge roller pair 327. The discharge unit 330 is made up of a sheet processing device capable of performing post-processing such as sorting, stapling, etc.

Also, in the event that a duplex recording mode is set, after the recording sheet is conveyed to the discharge roller pair 327, the rotating direction of the discharge roller pair 327 is reversed, and the recording sheet is guided to a re-supply conveying path 339 and roller 329 by a flapper 328. The recording sheet guided to the re-supply conveying path 339 is re-supplied between the photosensitive drum 323 and transfer unit 325 with the above-described timing, whereby the toner image is transferred to the back face of the recording sheet.

Figure 4:
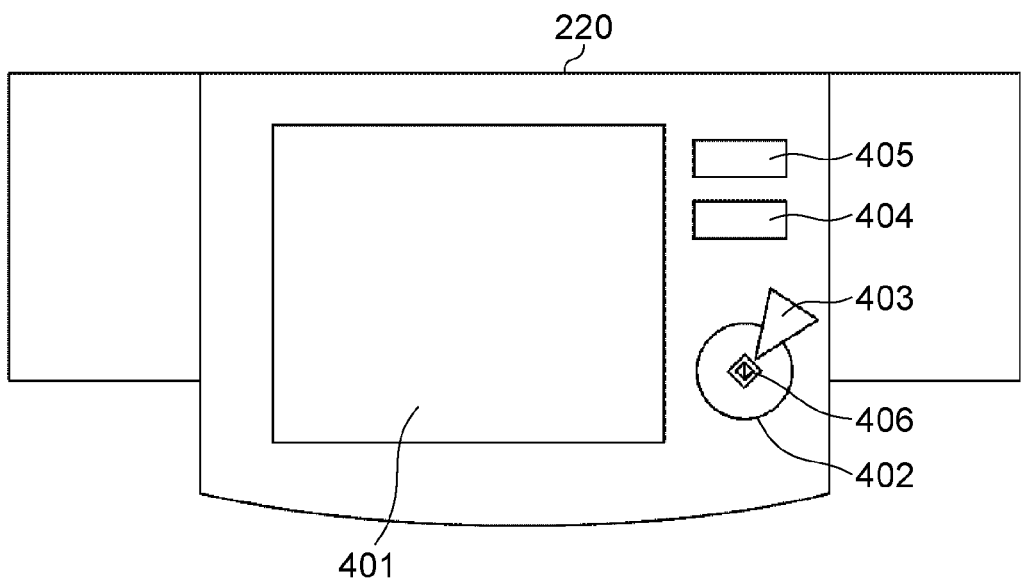
FIG. 4 is a plan view of the configuration of an operating unit.

FIG. 4 is a plan view illustrating the configuration of the operating unit 220. An LCD display unit 401 includes a touch panel sheet adhered to an LCD, and displays operating screens for the photocopiers 102 and 105. Upon a key displayed on the operating screen being pressed, the location information is communicated to the CPU 201 of the controller unit 200. As a result, the CPU 201 instructs executing of the instructed processing.

A start key 402 initiates a reading operation for a document image. A two-color LED 406 is provided in the central portion of the start key 402, whereby the color thereof indicates whether the start key 402 is in a usable state. For example, green indicates the start key 402 is usable while red indicates the start key 402 is not usable. A stop key 403 is operated to stop the reading operation. An ID key 404 is employed to input the user ID of a user. A reset key 405 is employed to initialize the setting from the operating unit 220.

Figure 5:
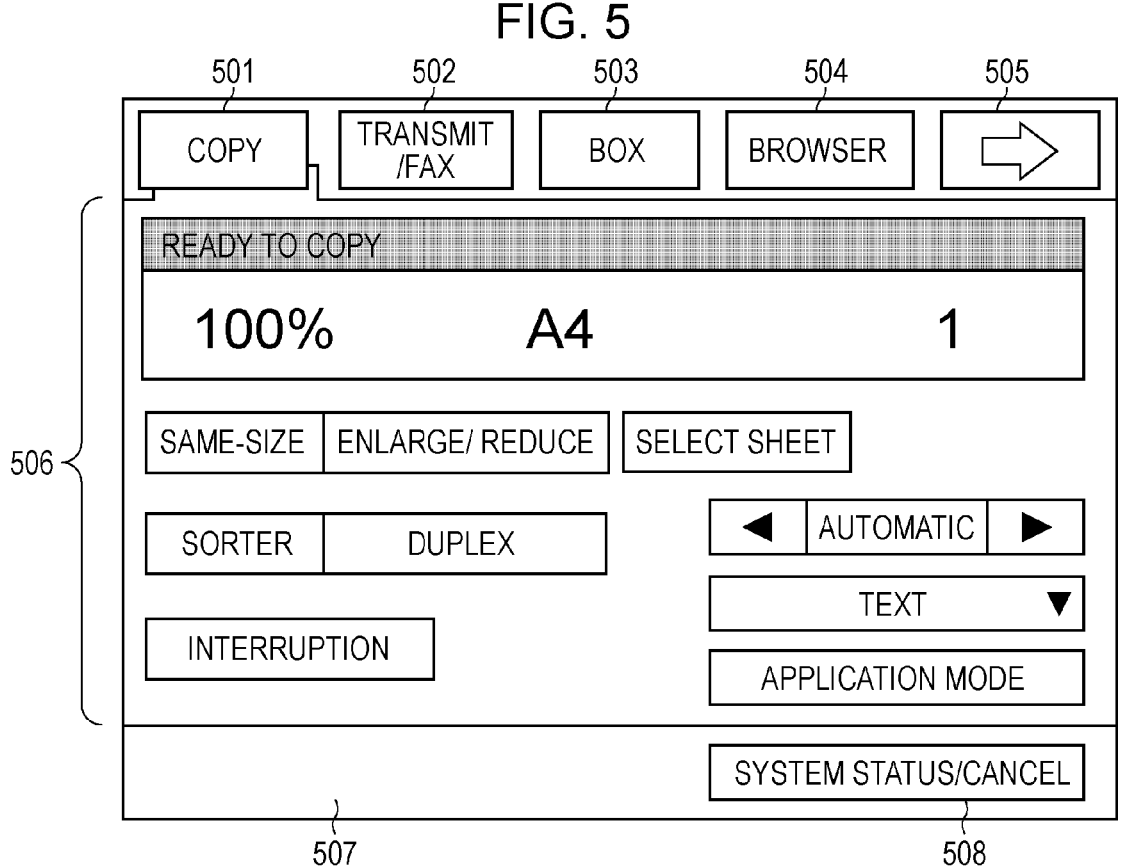
FIG. 5 is a diagram illustrating an example of an operating screen displayed on the operating unit.

FIG. 5 is a diagram illustrating an example of the operating screen displayed on the operating unit 220. The upper portion of the operating screen of the operating unit 220 includes displays for selecting the various functions, such as touch keys for a copy tab 501, transmission/FAX tab 502, box tab 503, browser tab 504, and right arrow tab 505.

FIG. 5 illustrates an initial screen of the copy function when the touch key for the copy tab 501 is selected. The display relating to the copy function is performed at a region 506. Region 506 includes a section indicating, among other things, the status of photocopier 102 or 107, the enlarge/reduce ratio, the supply sheet selection, and the number of copies to be produced. Region 506 also includes a section that includes, but is not limited to, touch keys for setting an operation mode for the copy function, same size, enlarge/reduce ratio, sheet selection, sorter, duplex, interruption, text, a left arrow key to correspond to lightening for darkness adjusting, a right arrow key to correspond to darkening, and an automatic key for automatically adjusting the darkness are displayed. Also, a specifying screen for the operation mode which cannot be fully displayed on the initial screen can be displayed within a region 506 in a layered manner, by pressing an application mode key.

The display region 507 is a region for displaying status of the photocopier 102, and is a region for displaying alarm messages, such as supply sheet jams, etc., or a status message indicating, for example, that PDL printing is in process when PDL printing is being performed. The display region 507 includes a system status/stop touch key 508 displayed therein. Upon the system status/stop touch key 508 being pressed, a screen for displaying device information for the photocopier 102 or a screen (not shown) for displaying a print job status is displayed, enabling stopping of the job with this screen.

Upon the transmission/FAX tab 502 being pressed, a setting screen (not shown) for sending an email transmission or a FTP transmission of an image read with the photocopier 102 is depicted.

Upon the box tab 503 being pressed, a setting screen (not shown) for storing the image read with the photocopier 102 in the box region of the HDD 209, or specifying and printing the image data stored within the box region, or transmitting the image to a device on the LAN, is displayed.

Also, in the event that more functions than can be displayed at one time are provided on the controller unit 200, a right arrow key 505 is displayed. Upon selection of the right arrow key 505, a screen for the additional function(s) is displayed.

Figure 6:
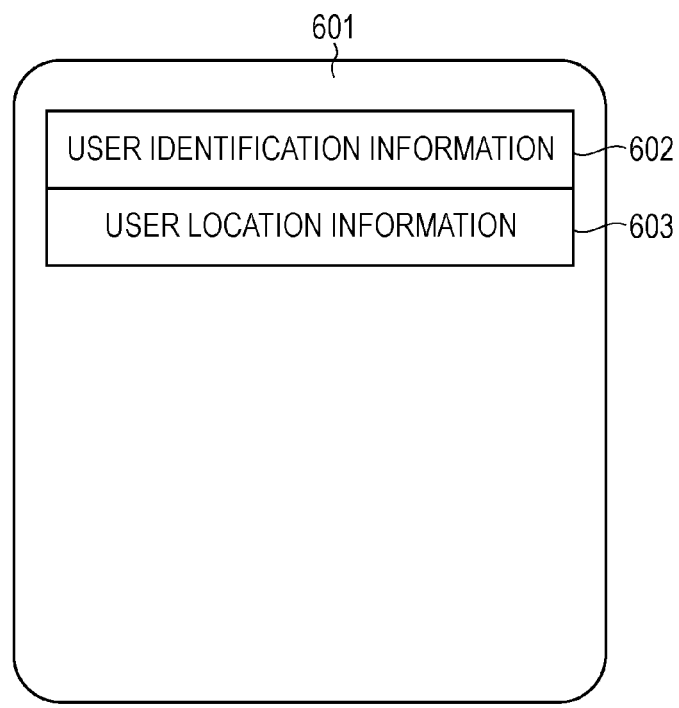
FIG. 6 is a schematic drawing of an IC card and content information stored in a memory region stored within the IC card.

FIG. 6 is a schematic drawing of an IC card and content information stored in a memory region stored within the IC card. The room entry IC card reader/writer 105 is capable of reading information stored in the memory region of an IC card 601 and writing information within the memory region. Similar processing can be performed with the room exit IC card reader/writer 106, the photocopier IC card reader/writer 103, and the photocopier IC card reader/writer 108.

User identification information 602 is information stored within the memory region of the IC card 601, and is information which can uniquely identify a user holding the IC card 601. User location information 603 is information stored within the memory region of the IC card 601, and is information indicating the location of the user. The user location information 603 can be changed depending on whether a user has entered/exited a particular area/room.

Figure 7:
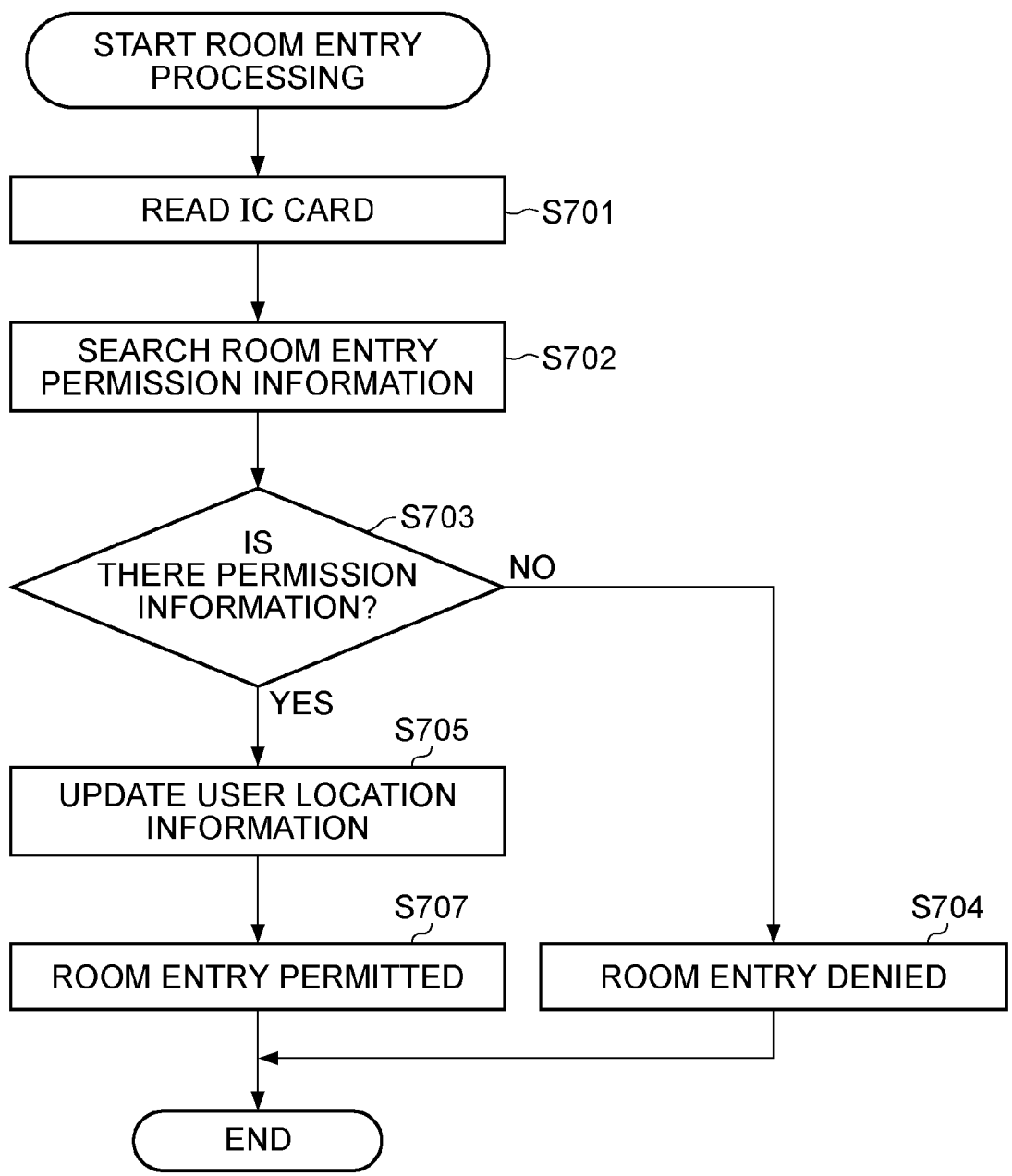
FIG. 7 is a flowchart of room entry processing.

FIG. 7 is a flowchart of room entry processing performed with the room entry IC card reader/writer 105 in the event of room entry from the reception room 100 to the office room 101. In the case that a user enters the office room 101, the IC card 601 held by the user is read by the room entry IC card reader/writer, whereby the room entry process in FIG. 7 is started.

In step S701, the room entry IC card reader/writer 105 reads the user identification information 602 recorded in the memory of the IC card 601 of the user.

In step S702, the room entry IC card reader/writer 105 searches a list of room entry allowable users which is registered therewithin beforehand. Next, in step S703, it is determined whether there is information which matches the user identification information 602 obtained in step S701.

In the event that there is user identification information 602 in the list of room entry allowable users, flow proceeds to step S705. If there is no such information, the flow proceeds to step S704.

In step S704, the room entry IC card reader/writer 105 prohibits room entry, and the process ends without opening the electronic lock door 104.

In step S705, the room entry IC card reader/writer 105 writes the information of the location the user is entering (e.g. "office room 101") in the user location information 603 on the IC card 601.

In step S707, the room entry IC card reader/writer 105 permits room entry for the user, and opens the electronic lock door 104.

Thus, room entry processing when a user enters office room 101 using an IC card 601 has been described. Note that similar processing is performed for a user in the office room 101 exiting the office room 101 and entering the reception room 100 by employing a room exit IC card reader/writer 106 and IC card 601. In this case, this is executed as processing for entering the reception room 100. Accordingly, at the point of ending room entry processing wherein movement to the reception room 100 has been completed, the room exit IC card reader/writer 106 records the location information as "reception room 100" in the user location information 603 of the IC card 601. Also, the user location information may be initialized (i.e. in a state wherein the user is not entered in any room) along with the room exit.

Figure 8:
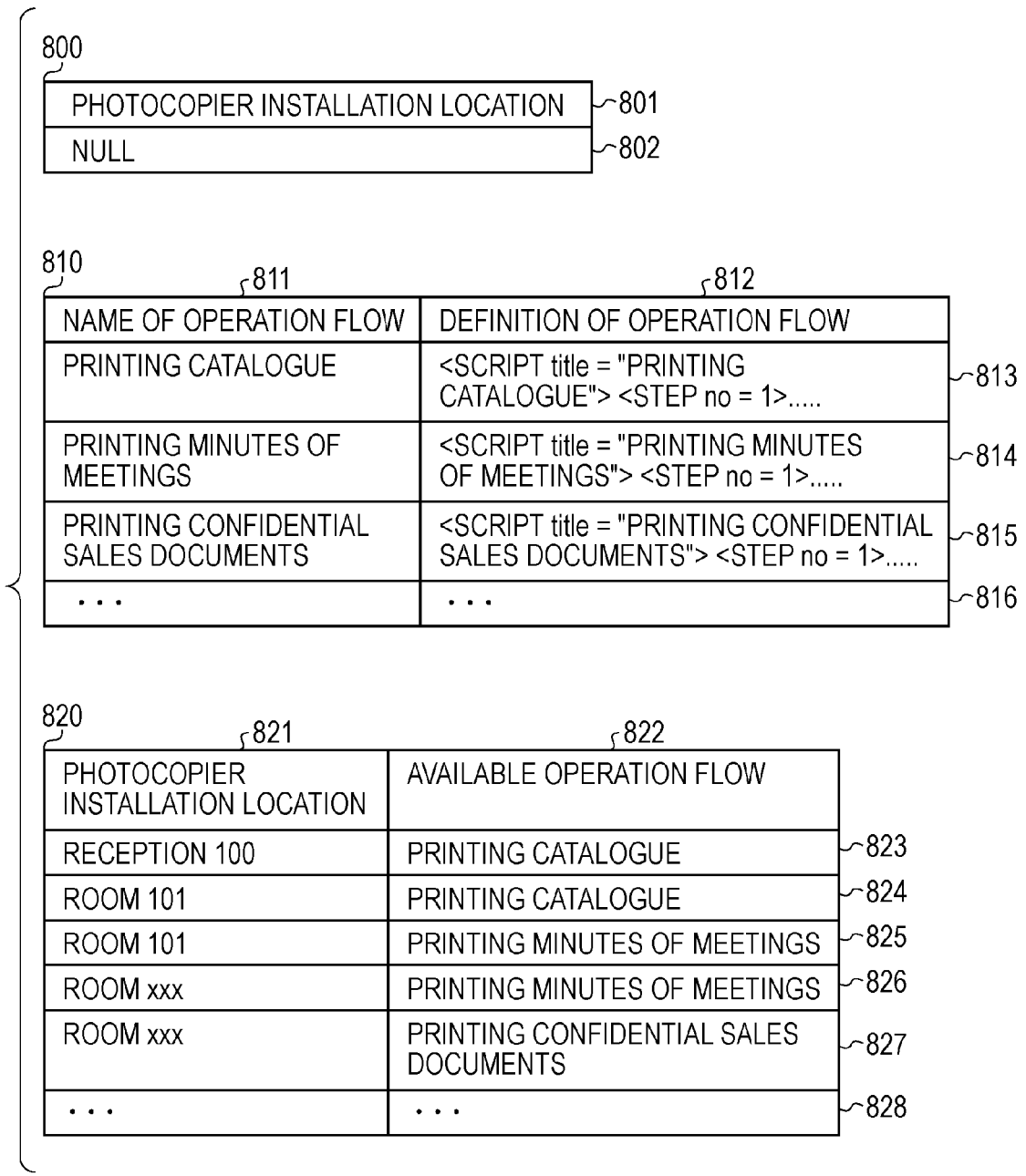
FIG. 8 is a definition of operation flow information stored within an HDD of a photocopier and an example of data.

FIG. 8 illustrates an example of a definition and data of operation flow information stored within the HDD 209 of photocopiers 102 and 107.

Photocopier setting information 800 is information for managing the installation location of the photocopier. A photocopier installation location 801 of the photocopier installation location information 800 includes information set to show the location where a photocopier is installed. Data example 802 illustrates that a value is not set (NULL) in the photocopier installation location 801. Note that with the present embodiment, in a state wherein a user is not causing the IC card reader/writer installed on the photocopier to read the IC card held by the user, the photocopier installation location 801 is set as NULL. That is to say, this is in a state of not knowing where the photocopier is installed.

Operation flow information 810 is information to manage the operation flow definition registered in the photocopier. Operation flow name 811 includes a name to uniquely identify the operation flow set thereto. An operation flow definition 812 includes processing content of a flow defined as an operation flow set thereto. Data example 813 illustrates a data example of an operation flow for "catalog printing". Similarly, data example 814 illustrates a data example of an operation flow for "meeting minutes printing", and data example 815 for "sales confidential document printing". Data example 816 illustrates that operation flows other than these can also be defined.

With the present embodiment, all operation flow information defined as an operation flow is registered on all photocopiers, regardless of the installation location of the photocopiers. That is to say, the various photocopiers are in a state of having operation flows registered thereto which execution thereof is not allowed at the installation location of the photocopier. Thus, by not separating out operation flows to register and operation flows to not register according to the installation location of the photocopier, and arranging for the same operation flows to be registered in all of the photocopiers, the registrant performing the operation flow registration can simplify the operation flow registration work.

Note that with the present embodiment, the flow content itself is set in the operation flow definition 812, but an arrangement may be made wherein the operation flow content is written in a separate definition file, and a path to indicate the definition file may be written.

An operation flow executable location list 820 is information illustrating the relation between the installation location of the photocopier and the operation flows executable at that installation location. That is to say, the HDD 209 stores information relating to executable locations for each operation flow.

A photocopier installation location 821 is a location where the photocopier is installed. A usable operation flow 822 illustrates the operation flows executable at that installation location. Data example 823 illustrates that the operation flow executable in the reception room 100 is catalog printing (data example 813). Also, data example 824 and data example 825 illustrate the executable operation flows in the office room 101. Data example 826 and data example 827 illustrate the operation flows executable at an installation location called office room xxx. Data example 828 illustrates that similarly executable operation flows are defined for installation locations other than these.

According to the present invention, as described with the operation flow executable location list 820, installation location information for each executable operation flow for all of the operation flows are registered in each photocopier, regardless of the installation location thereof. That is to say, even with the photocopier 102 installed in the reception room 100, for example, information executable at installation locations other than the reception room 100, such as that illustrated in data examples 824 through 828, is registered therein. Consequently, since the content of the information to be registered does not change depending on the installation location of the photocopier, the same information content can be registered for all of the photocopiers, whereby registration work can be simplified, facilitating an advantage in that setting errors and so forth do not readily occur.

Figure 9:
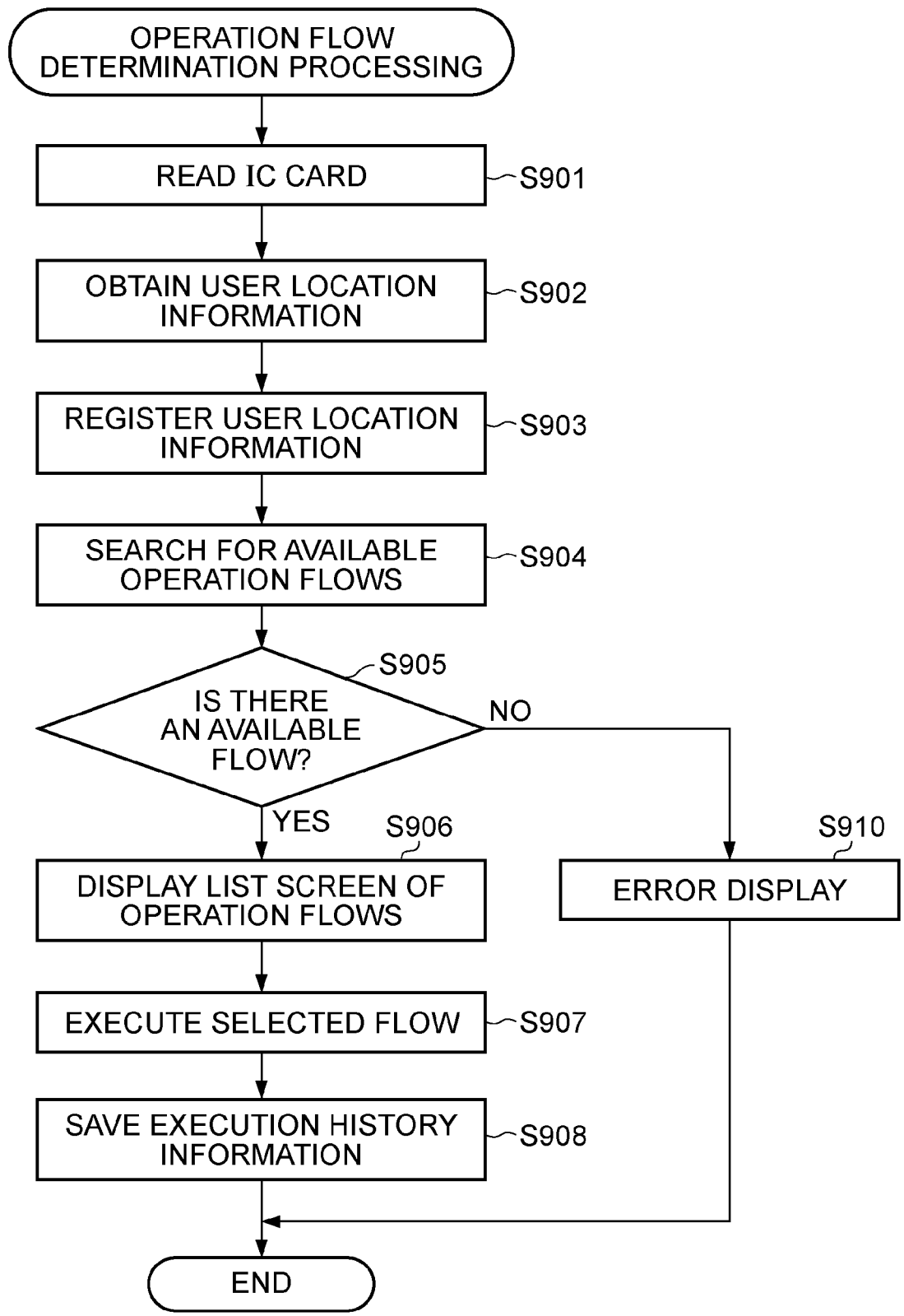
FIG. 9 is a flowchart of operation flow determining processing.

FIG. 9 is a flowchart of operation flow determining processing to arrange an executable state for operation flows executable at each installation location with the photocopier 102 and photocopier 107. Note that each step of the flowchart in FIG. 9 is executed by the CPU 201 of the photocopier.

Also, description will be given here with an example of a case wherein a user having entered the office room 101 uses the photocopier 107 and performs a display request for a list of usable operation flows.

In the event of a user entering the office room 101, the room entry processing described in FIG. 7 is performed, wherein an IC card is used. Accordingly, the location information "office room 101" is recorded in the user location information 603 of the IC card 601.

On the other hand, photocopier installation location information 800, operation flow information 810, and operation flow executable location list 820 such as that described in FIG. 8 is already defined within the photocopier 107 installed in the office room 101.

The user having entered the office room 101 operates the photocopier 107 to perform a display request for the usable operation flow list, and the photocopier 107 starts the operation flow determining process in FIG. 9.

In step S901, the photocopier IC card reader/writer 108 reads the information stored in the IC card 601 held by the user.

In step S902, the photocopier 107 obtains the information recorded in the user location information 603 of the IC card 601 via the photocopier IC card reader/writer 108. In other words, the photocopier 107 obtains room entry information of the user. In this case, as described above, the user performs room entry processing (FIG. 7) with the room entry IC card reader/writer 105 in the event of entering the office room 101. The location information of the user which is "office room 101" is recorded in the user location information 603 of the IC card 601. Since the user is using the photocopier 107 with this card, the photocopier 107 can be determined as being installed in the same location as the user.

Accordingly, in step S903, the photocopier 107 sets (registers) the user location information 603 read in step S902 in the photocopier installation location 801 of the photocopier installation location information 800. In other words, the photocopier 107 registers the room entry information obtained in the processing in step S902. Specifically, in the case of a user entering the office room 101 and executing with the photocopier 107, the photocopier changes the value of the photocopier installation location 801 from NULL to "office room 101".

In step S904, the photocopier 107 searches the usable operation flows. That is to say, based on the room entry information obtained in step S902 and the information relating to executable locations for the operation flow stored in the HDD 207 as described above with respect to FIG. 8, the operation flows executable at the locations indicated by the room entry information is extracted from the multiple operation flows.

More specifically, the photocopier 107 employs the value of the photocopier installation location 801 to search the operation flow executable location list 820, whereby the photocopier installation location 801 obtains information which matches with the photocopier installation location 821. In the current example, since the value of the photocopier installation location 801 is "office room 101", the photocopier 107 searches a data example executable with the "office room 101" from the operation flow executable location list 820. As a result, the photocopier 107 can recognize the two data examples 824 and 825 as executable data examples with the office room 101.

Figure 10:
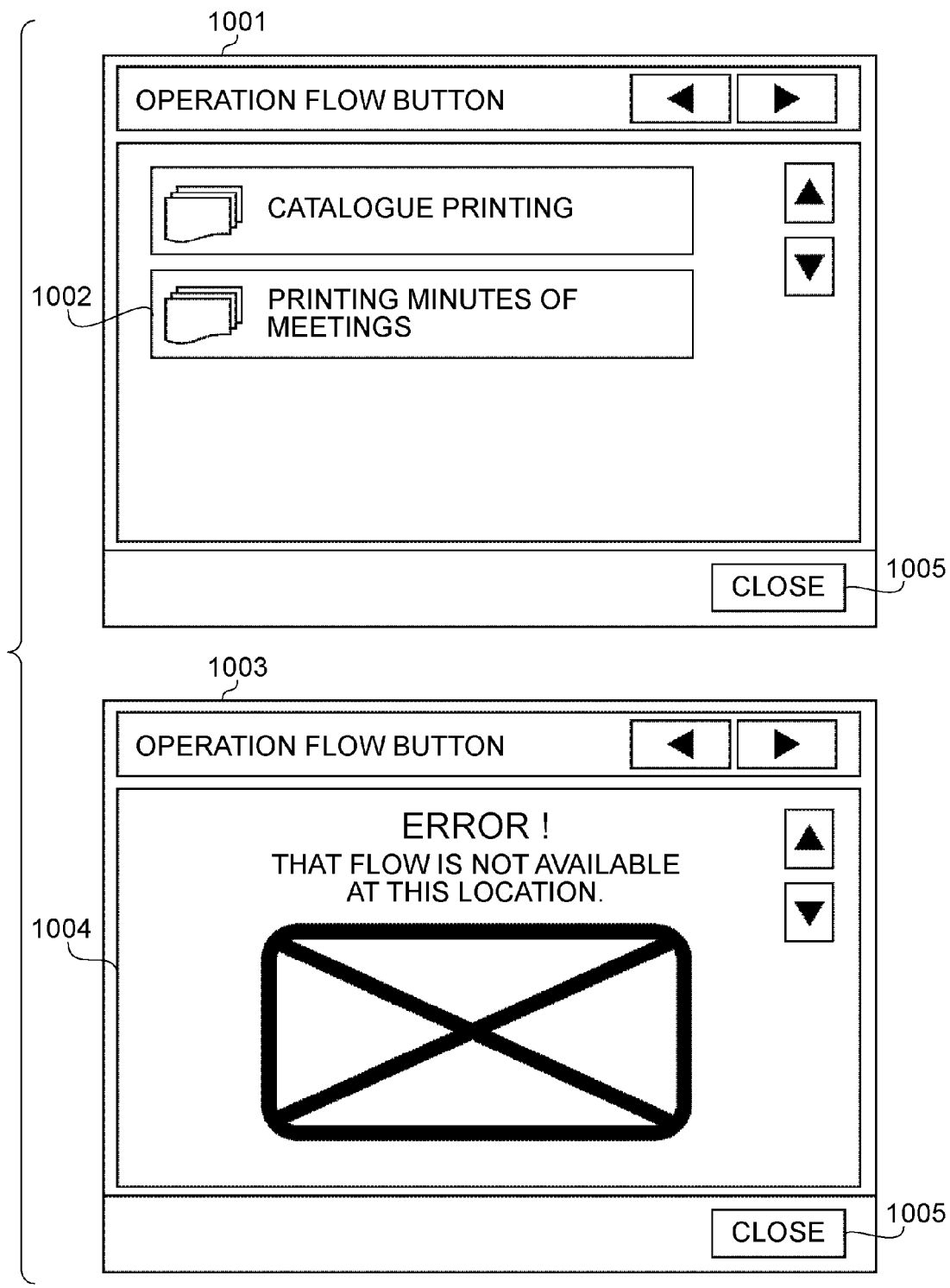
FIG. 10 is a screen display example of an operation flow menu.

In step S905, it is determined whether there is an available flow based on the results of step S904. If there is no available flow, the process proceeds to step S910, where an error message is displayed. Display screen 1003 in FIG. 10 illustrates an example of an error message. Message area 1004 of display screen 1003 displays the error content.

If, in step S905, it is determined there is an available flow, the process proceeds to step S906, where a list of usable operation flows is displayed. That is to say, the photocopier 107 displays an operation screen for executing the operation flows extracted with the processing in step S904. For example, if the value of the photocopier installation location 801 is "office room 101", the matching information is data examples 824, 825, and the photocopier 107 displays the operation flow list (e.g., screen 1001 in FIG. 10) based on the information thereof. Consequently, a button to execute the operation flow for "catalog printing" corresponding to the data example 824 and "meeting minutes printing" corresponding to the data example 825 is displayed in the operation flow button display area 1002 of the screen 1001 in FIG. 10.

In step S907, the photocopier 107 executes processing based on the flow selected via the operation flow list screen. Specifically, the processing content to be executed is registered in each flow, so the photocopier 107 sequentially executes the registered processing content.

In step S908, the photocopier 107 stores execution history information relating to the flow executed in step S907. That is to say, the photocopier 107 stores the history information relating to processing executed by the processing in step S907 and the data used when executing with the processing in step S907. For example, in the case of executing scanning processing, the photocopier 107 stores the scanned image data obtained by the scanning processing in an HDD 209 serving as a storage unit. Thus, by leaving executing history information, in the case of executing the same flow again, the scanning processing can be omitted, enabling efficient processing to be executed.

With the flowchart for operation flow determining processing in FIG. 9 as described above, the photocopier 102 determines the installation location based on the user location information 603 recorded in the IC card 601 held by the user. An executing button for the processing flow applicable to the installation location of the photocopier 102 is then displayed as a usable flow. Consequently, for example, even if a photocopier is installed in a location such as a reception room where many people come and go, only the flows usable in the reception room are displayed as executable, and the flows where processing is executed with high confidentiality is not displayed since they are not executable, enabling maintaining of confidentiality.

Also, in the case of registering usable flows for each installation location of a photocopier, the usable flow information must be changed each time the photocopier is moved. However, by employing the processing in the present embodiment, even if the installation location of the photocopier is changed, the usable flows can be determined by employing room entry information of the user. Therefore, the usable flow information defined in the photocopier no longer needs to be changed with the moving of the photocopier, facilitating improvement to the usability thereof.

Figure 11:
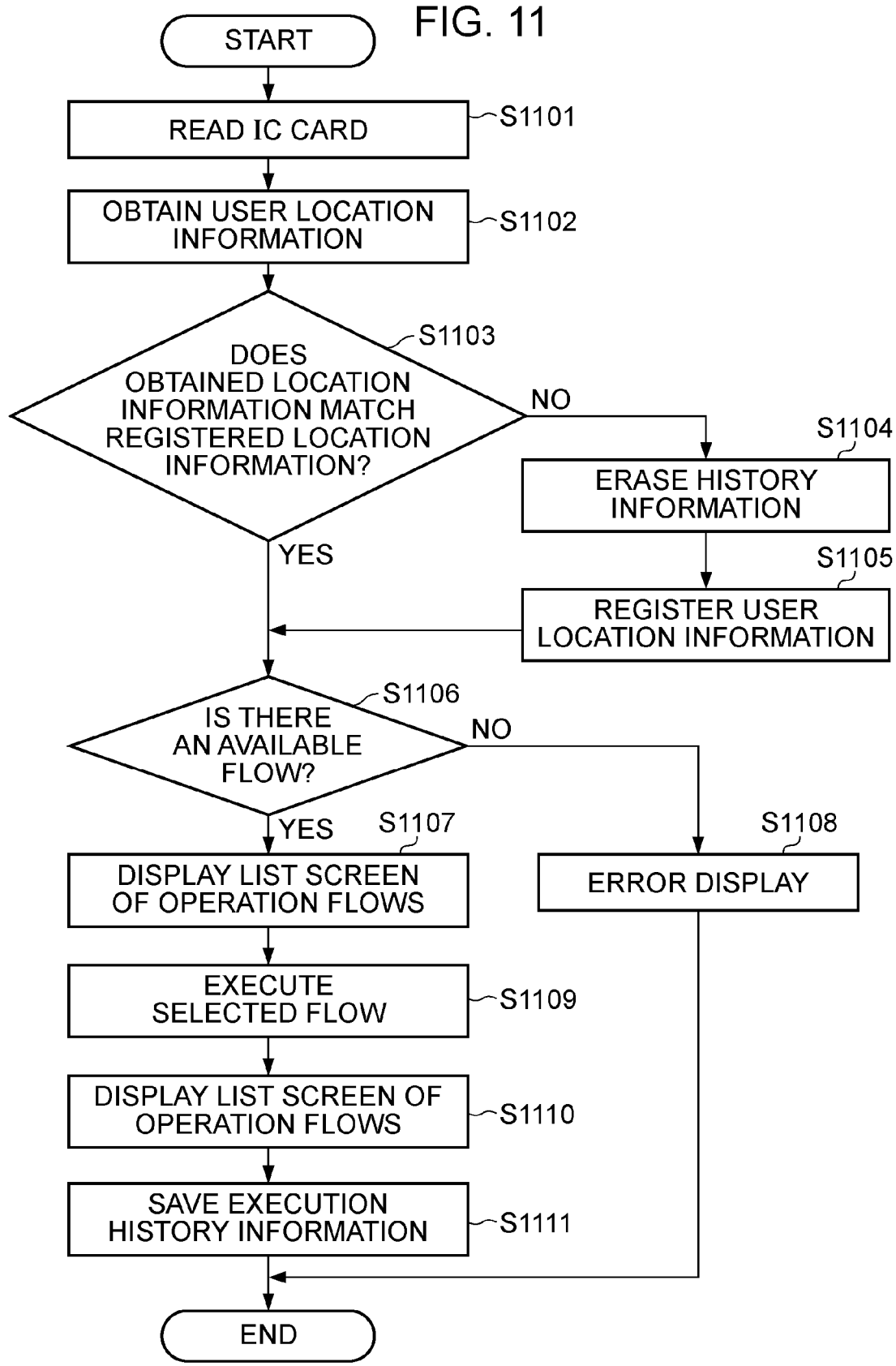
FIG. 11 is a flowchart of operation flow determining processing.

FIG. 11 is a flowchart illustrating processing content executed after the obtained user location information is set at the photocopier installation location, wherein each step is executed by the CPU 201.

Steps S1101 and S1102 are similar to the above-described steps S901 and S902, so detailed description thereof will be omitted.

In step S1103, the photocopier 107 determines whether the registered photocopier installation location information and the newly obtained user location information in step S1102 match.

In the event determination is made that there is no match, flow proceeds to step S1104, where the photocopier 107 deletes the executing history information stored in the HDD 209. That is to say, the photocopier 107 deletes the history information stored in step S908 in FIG. 9 and the aforementioned data in the case that the room entry information registered in step S903, and the room entry information obtained in step S1102 after registration processing in step S903, are different.

Next, in step S1105, the photocopier 107 registers the user location information newly obtained in step S1102 in the photocopier installation location information.

If a determination is made in step S1103 that there is a match, the process proceeds to step S1106. The processing from steps S1106 through S1111 is similar to the above-described steps S905 through S910 so the detailed description thereof will be omitted.

In the event that the location information obtained in step S1103 in FIG. 11 and the registered location information is determined to be different, the photocopier 107 is determined to have been moved to a different location from the location where the processing of the flowchart in FIG. 9 is executed. Accordingly, leaving the executing history information for processing performed at a location before moving, even after having been moved to a different location, consumes memory by leaving history information which is less likely to be used in the future. Also, there is a problem from the perspective of security. In order to solve these problems, in the case that the location information obtained in step S1101 in FIG. 11 and the registered location information do not match, the history information is deleted, thereby solving the problems of memory reduction and security.

Also, in FIGS. 9 through 11, the registered photocopier installation location information remains stored as it was. However, for example, each time the operation flow list screen displayed in step S906 is deleted, the photocopier installation location information may be initialized (set as NULL).

With the first embodiment as described above, the following advantages of the present invention can be realized.

As described with FIG. 8, the same information, i.e. all of the operation flow information and all of the operation flow executable location list information, is registered as to all of the photocopiers. In other words, the registration work for operation flows and registered information content does not change according to the installation location of the photocopier, thus, simplifying the registration work, and reducing setting errors and the burden of registration work.

As described with respect to FIGS. 7 and 9, the information of the location of a user entering a room is recorded on the IC card, and the installation location of the photocopier is determined based on this information. Thus, work such as setting the photocopier installation location in the photocopier beforehand is unnecessary.

Also, in the event that the registered information differs among photocopiers of the same format for example, suitable flow cannot be executed if there is an incorrect installation location. However, with the present invention, the installation location of the photocopier is registered at the time of use of the photocopier. Thus, by determining the usable flow each time, the inconvenience of not being able to execute suitable flow due to incorrect photocopier installation location can be avoided. Also, based on the registered photocopier installation location, the photocopier can distinguish between a usable operation flow and an unusable operation flow, thereby enabling display of usable operation flow so as to be distinguishable. Further, even if the installation location of the photocopier is changed, setting the photocopier installation location is unnecessary, so setting change work is not performed, and the operation flows executable at the new installation location can be displayed to be distinguishable simply by performing moving of the photocopier, thereby preventing executing unsuitable flows at an installation location.

A second embodiment will now be described. With the first embodiment, the installation location of the photocopier is determined with the IC card of the user, thereby determining usable operation flows at the installation location thereof. In other words, the first embodiment is premised upon the user entering a room always having performed correct room entry processing in the event of entering a room. However, with a general security system, completely preventing an intruder from entering a room without the correct processing is difficult. Accordingly, the second embodiment describes an example wherein the installation location of the photocopier is managed more strictly.

With the present embodiment, the configuration of the photocopier, the information stored in the memory region stored within the IC card, the room entry processing, and the definitions of operation flow information stored in the photocopier are the same as with the first embodiment.

Figure 12:
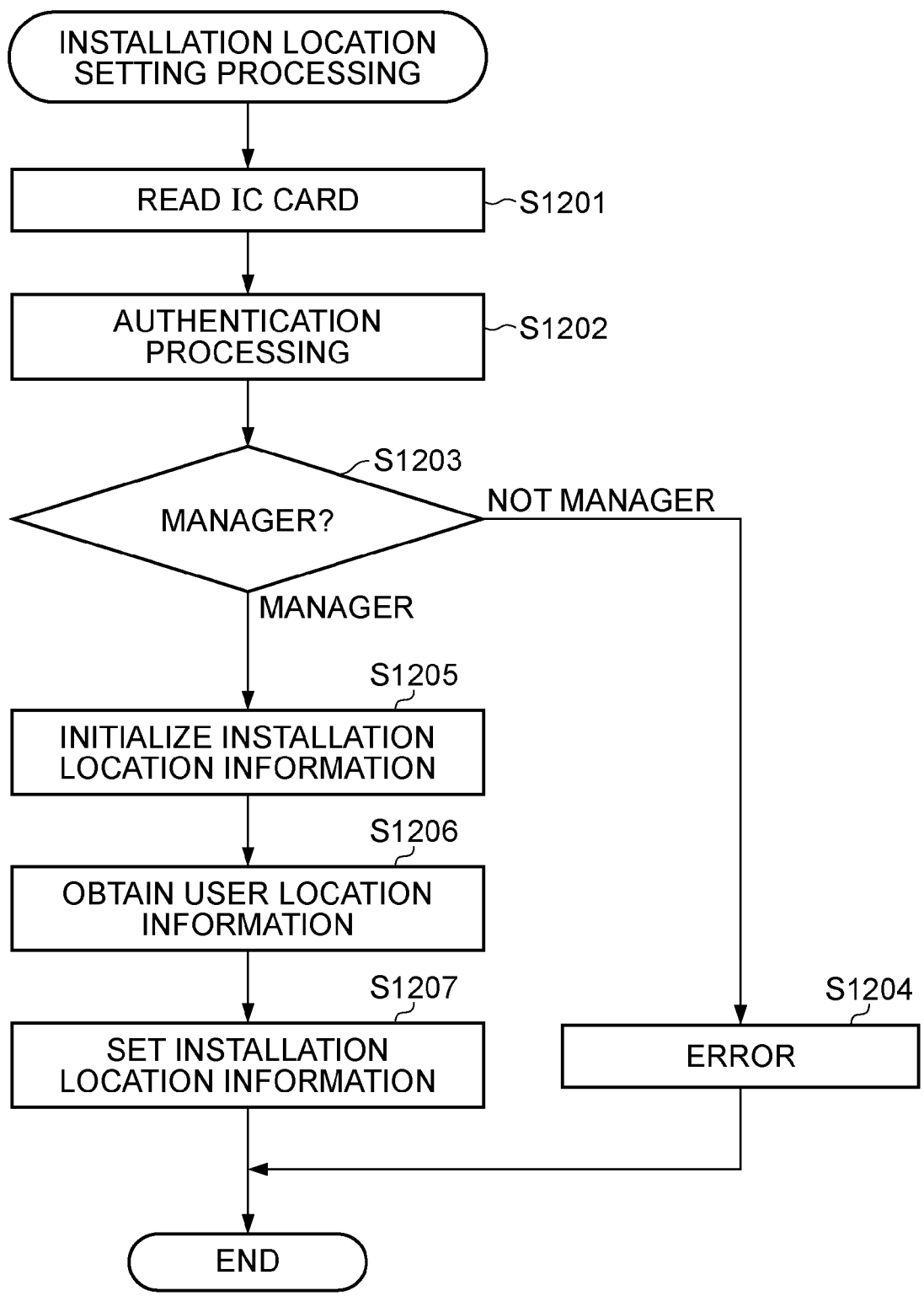
FIG. 12 is a flowchart of installation location setting processing.

FIG. 12 is a flowchart illustrating the installation location setting process for setting the installation location as to the photocopier 102 or 107 when installing the photocopier. The installation location setting process is executed with the CPU 201 employing an installation location setting application stored in the HDD 209 of the photocopier. The installation location setting application is executable only by a user having authority to manage the photocopier, such as a manager who manages the photocopier, and is executable in the case of installing the photocopier in an installation location.

The details of the installation location setting process flow will be described using an example where a new photocopier 107 is installed in the office room 101.

The manager of the photocopier moves the new photocopier 107 into the office room 101. At this time, the manager performs room entry processing as illustrated in FIG. 7 in order to enter the office room 101. Accordingly, the user location information 603 in the IC card 601 held by the manger is the location information "office room 101" recorded therein.

Upon the manger moving the photocopier 107 into the office room 101, the installation location setting application stored in the HDD 209 of the photocopier 107 is started, and installation location setting processing is executed.

Turning to FIG. 12, in step S1201, the photocopier 107 reads the IC card of the manager.

In step S1202, the photocopier 107 executes authentication processing. This authentication processing is, for example, to input a manager password, which is recorded in the HDD 209 of the photocopier 107 beforehand. Alternatively, the user identification information of the manger is set beforehand in the HDD 209, compared to the user identification information 602 of the IC card 601, and determination is made whether these match.

In step S1203, the photocopier 107 determines whether the holder of the IC card 601 read by the authentication processing in step S1202 is a specified user, i.e., the manager. That is to say, the photocopier 107 determines whether the current user equates to a specified user, based on identification information of the user which is read from the storage medium in step S1201.

In the event the user is determined to be not the manager, the photocopier 107 displays an error message in step S1204 and the flow ends. In the event the user is determined to be the manager, the flow proceeds to step S1205.

In step 1205, the photocopier 107 performs initializing processing of the installation location information. The photocopier 107 initializes the value of the photocopier installation location 801 in the photocopier installation location information 800 illustrated in FIG. 8, and sets to NULL. Thus, the photocopier 107 temporarily enters a state wherein the installation location is unknown.

In step S1206, the photocopier 107 obtains the user location information 603 of the IC card 601 of the manager which is read in step S1201. In the event that the photocopier is to be installed in the office room 101, "office room 101" is set in the user location information 603 of the IC card 601 held by the manager, so the photocopier obtains the user location information "office room 101".

In step S1207, the photocopier 107 sets the user location information obtained in step S1206 in the photocopier installation location 801. In other words, in the event that determination is made in step S1203 that the user is a specified user, the photocopier 107 registers the room entry information of the user as specified room entry information. Specifically, in the event that the manager enters the office room 101 and sets the installation location of the photocopier, the value "office room 101" is set in the photocopier installation location 801.

Thus, the installation location setting process ends. The installation location setting process in FIG. 12 obtains the user location information 603 recorded in the IC card 601 held by the manager and sets (registers) the installation location information of the photocopier 107. Accordingly, setting errors by a manager of the installation location do not occur, and the installation location can be correctly set in the photocopier 107.

Figure 13:
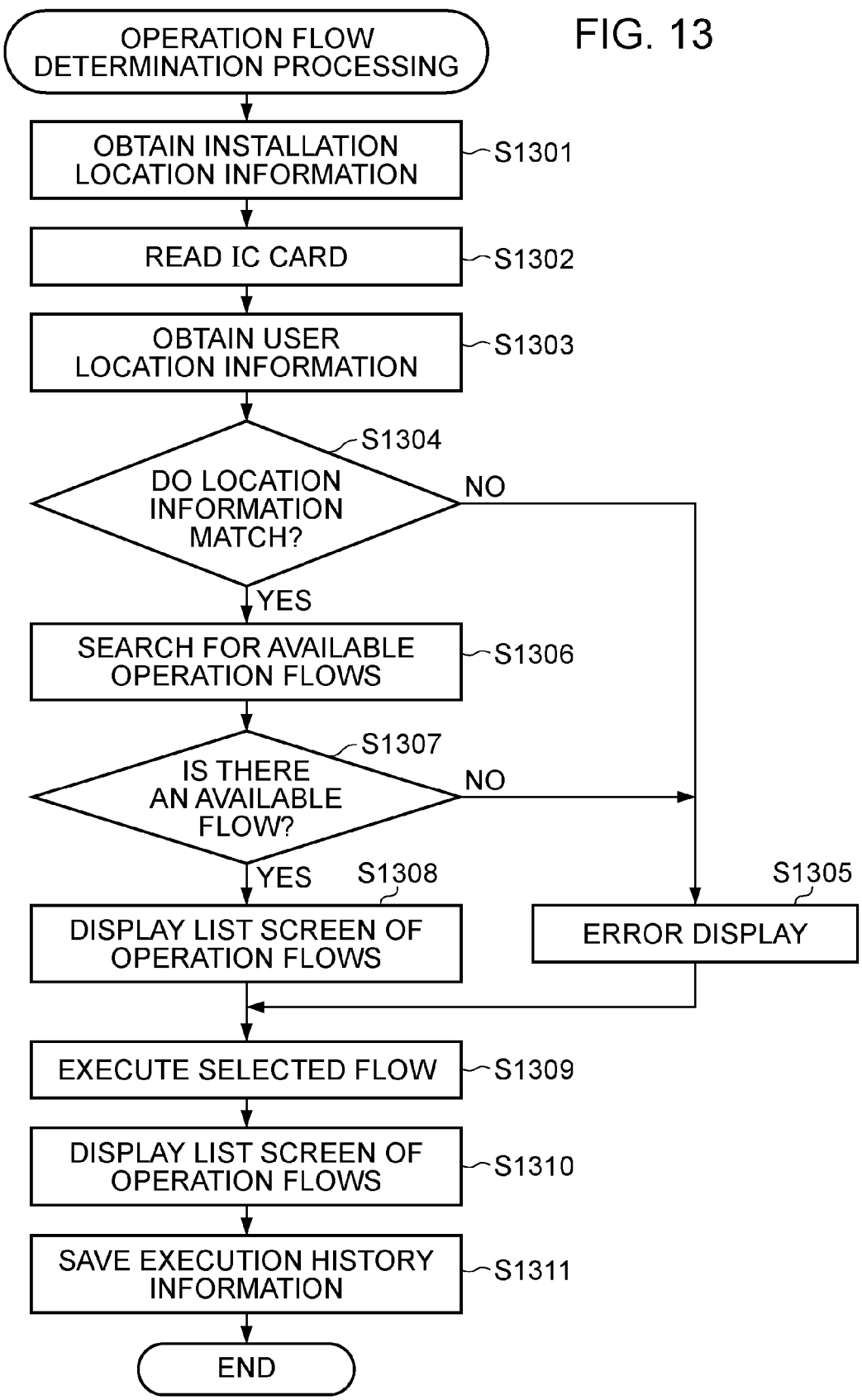
FIG. 13 is a flowchart of operation flow determining processing.

FIG. 13 is a flowchart of an operation flow determination process for causing the photocopiers 102 and 107 to be in an executable state for executable operation flow at each installation location. Note that the various steps in the flowchart in FIG. 13 are executed by the CPU 201.

As described by way of FIG. 12, the manager has installed the photocopier 107 in the office room 101. The photocopier 107 subjected to installation location setting processing described in FIG. 12 will be described with an example of a user entering the office room 101 to request display of a list of usable operation flows.

In the case that the user enters the office room 101, the IC card 601 is used to perform room entry processing described in FIG. 7. Accordingly, the user location information 603 of the IC card 601 has the location information "office room 101" recorded thereto.

On the other hand, the photocopier installation location information 800, operation flow information 810, operation flow executable location list 820 as described in FIG. 8 are already defined in the photocopier 107 installed in the office room 101. Also, with the installation location setting process in FIG. 12, the value "office room 101" is already set in the photocopier installation location 801.

Upon the user having entered the office room 101, operating the photocopier 107, and performing a display request for a usable operation flow list, the photocopier 107 starts the operation flow determining process in FIG. 13.

In step S1301, the photocopier 107 obtains the value set in the photocopier setting location 801 of the photocopier installation location information 800. In the present embodiment, "office room 101" is set as the photocopier installation location information 800 in the photocopier 107 with the processing in FIG. 12, so "office room 101" is obtained.

In step S1302, the photocopier 107 reads the IC card 601 held by the user.

In step S1303, the photocopier 107 obtains information recorded in the user location information 603 of the IC card 601 via the photocopier IC card reader/writer 108. In this case, as described above, the user performs room entry processing with the room entry IC card reader/writer 105 (FIG. 7) in the event of entering the office room 101. Accordingly, the information of the location of the user called "office room 101" is recorded in the user location information 603 on the IC card 601, so the photocopier 107 obtains a value "office room 101".

In step S1304, the photocopier 107 compares the value set in the photocopier setting location 801 obtained in step S1301, and the value set in the user location information 603 of the IC card 601 obtained in step S1303. That is to say, the photocopier 107 determines whether the specified room entry information of a manager registered in step S1207 in FIG. 12, and the room entry information obtained in step S1303 after the specified room entry information is registered, matches.

In the second embodiment, a user uses the photocopier by using an IC card, so the photocopier can be determined to be in the same location as the user. Accordingly, if the manager correctly performs room entry processing and performs the installation location setting processing in FIG. 12, and the user performs correct room entry processing, the comparison results in step S1304 will match.

From the comparison processing in step S1304, in the case that determination is made that the information matches, the flow proceeds to step S1306. On the other hand, from the comparison processing in step S1304, in the case that determination is made that the information does not match, the flow proceeds to step S1305 as an error. The values not matching are in the case where the installation location setting processing is not correctly performed, or that the user has not correctly performed room entry processing. Specifically, the following situations can be considered.

A first situation is where the installation location setting processing is not performed when the manager installs the photocopier. For example, the photocopier installation location 801 either has no installation location set therein (NULL), or the previous installation location value remains set. As a result, installation location information differing from the actual location where the photocopier is installed is set in the photocopier installation location 801. Note that this applies even in a case wherein a person who is not a manager moves the photocopier to another location.

A second situation is where a manager or an imposter pretending to be a manager enters the installation location without correctly performing room entry processing, and performs installation location setting processing. Since room entry processing is not performed, the user location information 603 of the IC card 601 in the event of executing the installation location setting process becomes a value different from the installation location of the photocopier. As a result, a value different from the actual installation location of the photocopier is set in the photocopier installation location 801.

A third situation is where a user or an imposter pretending to be a user enters the installation location without correctly performing room entry processing. For example, this is a case where a user enters the location without performing room entry processing with a room entry IC card reader/writer. In this case, the user location information 603 of the IC card 601 held by the user has a location recorded therein which is different from the location where the photocopier to be used is installed (i.e. the location where the user is currently located).

In any case, the installation location information setting processing for the photocopier, and correct room entry process, which should have been correctly performed, most likely was not.

In step S1306, the photocopier 107 employs the value in the photocopier installation location 801 to search the operation flow executable location list 820, and searches the usable operation flows for the location wherein the current photocopier 107 is set. Specifically, the photocopier installation location 801 obtained in step S1301 obtains information which matches the photocopier installation location 821. According to the operation flow executable location list 820 in FIG. 8, in the case that the value of the photocopier installation location 801 is "office room 101", the matching information is the two cases of data examples 824 and 825.

In step S1307, the photocopier 107 determines from the search results in step S904 that there is no usable operation flow in the case of no matching information, and the flow advances to step S1305. In the case of matching information existing, the flow advances to step S1308.

In step S1305, the photocopier 107 displays an error information. An example of the error display is illustrated in FIG. 10 as described above.

In step S1308, the photocopier 107 displays a list screen of a usable operation flow. An example is illustrated in FIG. 10 as described above. Specifically, if the value of the photocopier installation location 801 is "office room 101", the matching information are data examples 824 and 825, and display of the operation flow list based on the information thereof is performed.

Note that the processing in steps S1309 and S1310 is the same as the processing in steps S907 and S908 in FIG. 9 as described above. Thus, detailed descriptions of these steps will be omitted.

As described in the present embodiment, with the installation location setting processing in FIG. 12, it is clear that based on the user location information 603 recorded in the IC card 601 held by the manager, the photocopier installation location 801 of the photocopier can be easily and accurately set. For example, in the case that the manager has correctly entered the office room 101, the office room 101 is registered in the photocopier 107 as the installation location. After this, in the case that the user of the photocopier does not correctly enter the office room 101, the user location information of the IC card 601 for this user has location information recorded therein which is different from the office room 101. In this case, since the registered photocopier location information and the location information of the user differs, this user is determined to have not performed correct room entry processing and therefore may be an external person, and since flow execution is not allowed, security can be assured.

Note that with the description in the present application, a recording medium for recording the location of the user with a room entry process, and an IC card and IC card reader/writer serving as an authentication device for this recording medium is employed. However, these means are not to be limited to an IC card and IC card reader/writer. For example, any combination of a recording medium which can record information, such as a magnetic card and magnetic card reader/writer, a USB media and USB media reader/writer, etc., and a device wherein writing and reading of information as to the medium can be performed is suitable.

Also, with the present application, the room entry IC card reader/writer 105 stores the information of a user that can enter the office room, but the information processing device which can communicate with the IC card reader/writer (for example, a management server) can store the information of the user that can enter the office room. In this case, the IC card reader/writer transmits the identification information of the user read from the IC card to the information processing device, whereby the information processing device becomes the process to allow room entry of the user. In this case, the photocopier 107 obtains room entry information of the user from the management server.

According to the present invention, the load of the flow registrant can be kept from increasing greatly, and unsuitable flow execution can be prevented at the installation location of the image forming apparatus.

Note that the present invention supplies a software program to realize the function of the embodiment as described above (a program corresponding to the flowchart shown in the diagram in the embodiment) is supplied directly or remotely to the system or apparatus. This also includes a case wherein a computer of the system or an apparatus reads and executes the program code supplied to the system or apparatus computer.

Accordingly, in order to realize the function processing of the present invention with a computer, the program code itself to be installed in the computer realizes the present invention. That is to say, the present invention also includes a computer program itself to realize the function processing of the present invention. In this case, any of object code, a program executed by an interpreter, script data supplied to the OS, and the like, may be used, as long as there is a program function.

Examples of recording medium for supplying a program include a floppy disk, hard disk, optical disk, and the like. Also, further, an optical magnetic disk, MO, CD-ROM, CD-R, CD-RW, magnetic tape, non-volatile memory card, ROM, DVD (DVD-ROM, DVD-R), etc., may serve as a recording medium.

As another program supplying method, a homepage on the Internet may be accessed, employing a browser of the client computer. The computer programs according to the present invention can be supplied from the accessed homepage by downloading the program itself or compressed files including an auto-install function to the recording medium such as the hard disk. Also, the program code making up the program of the present invention can be divided into multiple files, and can be realized by downloading the files from different homepages. That is to say, a WWW server for downloading program files for realizing the function processing of the present invention with the computer as to multiple users is also included in the present invention.

Also, the program of the present invention can be encrypted, stored in a storage medium such as a CD-ROM, and distributed to users, whereby users having cleared predetermined conditions download the key information for decryption from the homepage via the Internet. The encrypted program can be executed by employing the key information, and be installed on a computer.

Also, the functions of the above-described embodiments can be realized by executing the program which has been read out. Also, the function of the above-described processing can be realized by the OS or the like running on the computer performing part or all of the actual processing, based on the instructions of the program.

Further, the program read out from the recording medium may be written into memory provided on a function expansion board inserted in a computer or a function expansion unit connected to a computer. Thereafter, part or all of the actual processing is performed by the CPU provided to the function expansion board or function expansion unit, based on the instruction for the program, realizing the functions of the above-described embodiments.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims the benefit of Japanese Application No. 2006-291273 filed Oct. 26, 2006, which is hereby incorporated by reference herein in its entirety.

What is claimed is:

1. An image forming apparatus for executing operation flow selecting from a plurality of operation flows wherein processing content is registered, the apparatus comprising:
   a processor and a memory;
   a storage unit configured to store information relating to a location where each of the operation flows is executable, wherein said each of the operation flows defining functions that enable executing a complex operation sequence as a flow;
   an obtaining unit configured to obtain room entry information of an authenticated user;
   an extracting unit configured to, based on room entry information obtained from the obtaining unit and information relating to executable locations for each operation flow stored by the storage unit, extract an executable operation flow with locations indicated by room entry information from the plurality of operation flows; and
   a display control unit configured to display an operation screen for executing an operation flow extracted by said extracting unit in response to obtaining the room entry information indicating location of the user from a storage medium of said authenticated user.

2. The image forming apparatus according to claim 1, further comprising:
   a reading unit configured to read information from a storage medium held by the user,
   wherein the obtaining unit obtains room entry information of the user which is read from the storage medium.

3. The image forming apparatus according to claim 2, further comprising:
   a registration control unit configured to register room entry information obtained by the obtaining unit; and
   a first determining unit configured to determine, based on user identification information read from the storage medium, whether a current user is a specified user,
   wherein if the first determining unit determines that the user is a specified user, the registration control unit registers room entry information of the current user as specified room entry information.

4. The image forming apparatus according to claim 3, further comprising:
   a second determining unit configured to determine whether the specified room entry information registered by the registration control unit and the room entry information obtained by the obtaining unit after the specified room entry information is registered matches,
   wherein if the second determining unit determines there is no match, the display control unit does not display executable operation flow.

5. The image forming apparatus according to claim 3, further comprising:
   an executing unit configured to execute processing registered in an operation flow selected from the operation flows extracted with the extracting unit.

6. The image forming apparatus according to claim 1, further comprising a communication unit configured to communicate with an information processing device,
   wherein the obtaining unit obtains room entry information from the information processing device indicating that the user has entered a room.

7. The image forming apparatus according to claim 1, further comprising:
   a registration control unit configured to register room entry information obtained by the obtaining unit;
   an executing unit configured to execute processing registered in a flow selected from the operation flows extracted with the extracting unit; and
   a storage control unit configured to store history information relating to processing executed with the executing unit and data employed at time of execution by the executing unit;
   wherein the storage control unit deletes the history information and the data in the event that the room entry information registered with the registration control unit and the room entry information obtained by the obtaining unit after the room entry information is registered differ.

8. A method in an image forming apparatus including a storage unit configured to store information relating to a location where operation flows are executable for executing operation flow selecting from a plurality of operation flows where processing content is registered, the method comprising:
   configuring a processor to perform the functions of:
   obtaining room entry information of frail an authenticated user;

extracting, based on obtained room entry information and information relating to executable locations for each operation flow defining functions that enable executing a complex operation sequence as a flow stored in the storage unit, executable operation flow with locations indicated by room entry information from the plurality of operation flows; and displaying an operation screen for executing an extracted operation flow in response to obtaining the room entry information indicating location of the user from a storage medium of said authenticated user.

9. The method according to claim 8, further comprising:
reading information from a storage medium held by the user,
wherein obtained room information of a user is obtained by reading the room information from the storage medium.

10. The method according to claim 8, further comprising obtaining room entry information from an information processing device indicating the user has entered a room.

11. The method according to claim 8, further comprising:
registering obtained room entry information;
executing processing registered in the operation flow selected from extracted operation flows; and
storing history information relating to executed processing and data employed at time of execution;
wherein the history information and the data are deleted in the event that registered room entry information and room entry information obtained after the room entry information is registered differs.

12. The method according to claim 8, further comprising:
registering obtained room entry information; and
determining, based on user identification read from the storage medium, whether a current user is a specified user,
wherein if it is determined that the user is a specified user, room entry information of the current user is registered as specified room entry information.

13. The method according to claim 12, further comprising:
determining whether registered specified room entry information and obtained room entry information obtained after the specified room entry information is registered matches,
wherein if it is determined there is no match, no executable operation flow is displayed.

14. The method according to claim 12, further comprising executing processing registered in an operation flow selected from extracted operation flows.

15. A non-transitory computer-readable storage medium storing a computer-readable control program executable in an image forming apparatus, including a storage unit configured to store information relating to a location where operation flows are executable, for executing operation flow selecting from a plurality of operation flows wherein processing content is registered, when executed by a processor, results in the computer performing the functions of:

obtaining room entry information of frail an authenticated user;

extracting, based on obtained room entry information and information relating to executable locations for each operation flow defining functions that enable executing a complex operation sequence as a flow stored in the storage unit, executable operation flow with locations indicated by room entry information from the plurality of operation flows; and displaying an operation screen for executing an extracted operation flow in response to obtaining the room entry information indicating location of the user from a storage medium of said authenticated user.

* * * * *